(12) United States Patent
Shaw et al.

(10) Patent No.: US 10,523,989 B2
(45) Date of Patent: Dec. 31, 2019

(54) PERSONALISED CHANNEL

(71) Applicant: PIKSEL, INC., Wilmington, DE (US)

(72) Inventors: Philip Shaw, Yorkshire (GB);
Hans-Jurgen Maas, Mainz (DE); Sean Everett, New York, NY (US)

(73) Assignee: PIKSEL, INC., Wilmington, DE (US)

( * ) Notice: Subject to any disclaimer, the term of this patent is extended or adjusted under 35 U.S.C. 154(b) by 0 days.

(21) Appl. No.: 15/523,050

(22) PCT Filed: Oct. 29, 2015

(86) PCT No.: PCT/EP2015/075159
§ 371 (c)(1),
(2) Date: Apr. 28, 2017

(87) PCT Pub. No.: WO2016/066760
PCT Pub. Date: May 6, 2016

(65) Prior Publication Data
US 2017/0339444 A1    Nov. 23, 2017

Related U.S. Application Data

(60) Provisional application No. 62/073,785, filed on Oct. 31, 2014.

(51) Int. Cl.
*H04N 21/262* (2011.01)
*H04N 21/25* (2011.01)
*H04N 21/2668* (2011.01)
*H04N 21/466* (2011.01)
*H04N 21/81* (2011.01)

(52) U.S. Cl.
CPC ...... *H04N 21/26241* (2013.01); *H04N 21/251* (2013.01); *H04N 21/2668* (2013.01); *H04N 21/26208* (2013.01); *H04N 21/26258* (2013.01); *H04N 21/4668* (2013.01); *H04N 21/812* (2013.01)

(58) Field of Classification Search
CPC .............................................. H04N 21/26258
See application file for complete search history.

(56) References Cited

U.S. PATENT DOCUMENTS

| 2009/0070819 A1* | 3/2009 | Gajda | H04H 60/65 |
| | | | 725/46 |
| 2009/0158342 A1* | 6/2009 | Mercer | G06Q 30/02 |
| | | | 725/46 |

(Continued)

FOREIGN PATENT DOCUMENTS

| EP | 2164247 A2 * | 3/2010 | ............... H04N 5/44 |
| EP | 2164247 A2 | 3/2010 | |
| EP | 2362649 A1 | 8/2011 | |

OTHER PUBLICATIONS

International Search Report and Written Opinion, WO, dated Jan. 29, 2016.

*Primary Examiner* — Michael H Hong
(74) *Attorney, Agent, or Firm* — Holzer Patel Drennan

(57) ABSTRACT

There is disclosed a content delivery system for delivering content to a user, the system comprising a personalised schedule controller configured to receive content recommendations for a user including at least one constrained asset, and for generating a personalised schedule for the user in dependence on the at least one constrained asset included in the content recommendation.

20 Claims, 7 Drawing Sheets

(56) References Cited

U.S. PATENT DOCUMENTS

| | | | |
|---|---|---|---|
| 2009/0313667 A1* | 12/2009 | Zhao | H04N 7/17318 |
| | | | 725/93 |
| 2011/0307929 A1 | 12/2011 | Yousefmir | |
| 2012/0284744 A1 | 11/2012 | Kumar | |
| 2013/0081085 A1 | 3/2013 | Skelton et al. | |
| 2014/0310759 A1 | 10/2014 | Canney et al. | |

* cited by examiner

PERSONALISED CHANNEL

CROSS-REFERENCE TO RELATED APPLICATIONS

The present application incorporates by reference all subject matter included in the following applications, which are identified by their official application number and the short title given to them to denote their subject matter as an internal designation:

1. U.S. 62/033,520—"Navigational Paradigm"
2. U.S. 62/033,445—"Context Driven Content"
3. U.S. 62/033,448—"Eco System"
4. U.S. 62/033,471—"Sequence of Delivery"
5. U.S. 62/033,473—"Swipe Based Volume Control"
6. GB 1416052.7—"Wearables"

The six cases listed above are referred to herein as the "Context-Based Recommendation" applications.

The present application also incorporates by reference all the subject-matter included in the following application:

7. GB 14305489.8—"Advertising System"

BACKGROUND TO THE INVENTION

Field of the Invention

The invention relates to a content delivery system.

Description of the Related Art

Content display and delivery systems exist to provide users of computer devices with information and entertainment. Content comprises a large number of different kinds of presentation materials, including images and text. Content includes dynamic media such as weather and news updates, social media such as Twitter and Facebook, information such as email and entertainment such as video (both Video on Demand VOD and Linear (broadcast channel LC)).

It is increasingly problematic for a user to efficiently and successfully navigate their way through this vast proliferation of content to receive and view only that which is relevant to the user. This is wasteful of a user's time and network resources, as well as local processing and storage resources.

The context-based recommendation cases incorporated by reference herein and listed above describe a content delivery system in which a content delivery server is configured to select from multiple content items a set of content items for display to a user at a user terminal, the content delivery server having access to content identifiers, identifying content items for delivery, the content delivery server comprising: a processor operating a content selection program which is arranged to receive the context data for different contexts and to select a set of content items in dependence on the context data, wherein the content items in the set can vary with the context data, such that the content of items in a first set for a user in a first context could be different from the content of items in a second set for the same user in a second context, and to transmit a recommendation message to a user terminal comprising a set of content identifiers.

Thus, according to the context-based recommendation cases incorporated by reference herein, the context of a user can be used to enhance recommendations.

With the large number of linear channels available to most television viewers it can be hard for a user to locate content that they wish to watch, and hard for a user to locate a next programme after a previous one ends.

Not only is the number of channels increasing, but the size of most on-demand catalogues is also growing significantly. Moreover, many operators offer both linear television viewing as well as access to video on demand (VOD) libraries.

For many users this provides an overwhelming volume of content, and presented with such an overwhelming volume of content and with few tools to navigate it successfully, many users stay within the confines of the channels and content genre with which they are familiar, and a large amount of content may then go undiscovered as a result.

It is an aim of the present invention to provide an improved content delivery system.

SUMMARY OF THE INVENTION

In one aspect there is provided a content delivery system for delivering content to a user, the system comprising a personalised schedule controller configured to receive content recommendations for a user including at least one constrained asset, and for generating a personalised schedule for the user in dependence on the at least one constrained asset included in the content recommendation.

The personalised schedule may be generated for a time window having a start time and a finish time.

The constrained asset may be a linear asset having a predetermined start time. The personalised schedule controller may be configured to time-shift the linear asset. The personalised schedule controller may be configured to time-shift the linear asset having the predetermined start time within the time-window of the personalised schedule to start at another time within the time window of the personalised schedule. The linear asset may be time-shifted to start at another time within the further constraint that the linear-asset finished within the time window.

The constrained asset may be an asset having a linear lifetime. The linear lifetime coincides with the time window of the personalised schedule.

The constrained asset may be a live asset.

The constrained asset may be a play-out constrained asset. The play-out constraint may be determined by a contractual obligation.

The content recommendations may include a plurality of types of asset. A priority may be associated with the types of asset, and the personalised schedule may be compiled in dependence on the priority of the asset type. Each type of asset of a given priority may be considered for inclusion in the generated personalised schedule, and on completion of consideration of all assets of that priority the assets of the next lowest priority may be considered. Constrained assets may have a higher priority than non-constrained assets. If there is more than one type of constrained asset, the different types of constrained asset may be allocated to different priorities. The consideration of an asset may include comparing the recommendation match of the asset to a threshold. The assets of each priority type may be considered in turn in accordance with the assets having the highest recommendation match.

The content recommendations for the user are dynamic, and the generated personalised schedule is generated dynamically.

The content recommendations for the user are, in part, based on the user context.

A corresponding method may be provided, and in this aspect there is provided a method for delivering content to a user, comprising receiving content recommendations for a user including at least one constrained asset, and generating a personalised schedule for the user in dependence on the at least one constrained asset included in the content recommendation.

According to an example a content delivery system is provided for delivering content to a user, the system comprising: a personalised schedule controller configured to receive content recommendations for a user based on a user context, and for generating a personalised user schedule in dependence on the scheduled linear content included in the content recommendations.

A personalised channel is configured based on the personalised schedule.

A personalised schedule is an ordered list that plays content on a single channel, which may be termed a personalised channel, at scheduled non-overlapping times.

The personalised user schedule may be based on user context, if the content recommendations are based on user context. The content recommendations may additionally take into account user policies.

The content recommendations for the user may be dynamic based on a dynamic assessment of a user context, and the generated schedule may be adapted dynamically.

Thus a personalised schedule may be adapted based on recommendations being adapted in accordance with a changing user context.

The content delivery system may further comprise a recommendation engine for generating the content recommendations for a user based on a user context.

If there is more than one scheduled linear content item recommended by the recommendation engine for a particular timeslot, an algorithm may be applied to determine the linear content to be allocated to the personalised user schedule for that timeslot.

In the described embodiment, the algorithm is to simply take the top ranked item of a list of ranked items from the recommendation engine, but other more complex algorithms may be used.

The system may further comprise an asset list for the user identifying limited lifetime assets and/or persistent (VOD) assets, wherein the personalised user schedule is additionally generated based on the limited lifetime assets and/or the persistent assets.

If a timeslot is empty after the personalised user schedule is generated based on the scheduling of linear content, a limited lifetime asset may be allocated to that timeslot. If there is more than one limited lifetime asset associated with a particular timeslot, then an algorithm may be applied to determine the limited lifetime asset to be allocated to the personalised user channel for that timeslot.

The system may further comprise an asset list for the user identifying persistent assets for the user, wherein the personalised user schedule is generated in dependence on the persistent assets. If a timeslot is empty after the personalised user schedule is generated based on the scheduling of linear content and the limited lifetime assets, a persistent asset may be allocated to that timeslot. If there is more than one persistent asset associated with a particular timeslot, then an algorithm may be applied to determine the persistent asset to be allocated to the personalised user schedule for that timeslot.

In the embodiments when the personalised schedule controller looks at the range of linear programmes available for a given slot, it picks the one that best matches the user's preferences. If no such programme provides a good enough match, then other content is considered (e.g. on-demand, OVP etc.). A match may be considered good enough if the quality of the suggestion provided by the recommendation engine is above a particular threshold.

There is provided a method for delivering content to a user of a content delivery system, the method comprising: receiving content recommendations for a user; and generating a personalised user schedule for the user in dependence on the linear content included in the content recommendations.

The method may further comprise dynamically adapting the step of generating the personalised user schedule in dependence on dynamic changes to the content recommendations for the user.

The method may further comprise providing an asset list for the user identifying limited lifetime assets and/or persistent assets, wherein the step of generating a personalised user schedule is further in dependence upon the limited lifetime assets and/or the persistent assets.

BRIEF DESCRIPTION OF THE DRAWINGS

The invention is described by way of example with reference to the accompanying drawings, in which.

DESCRIPTION OF PREFERRED EMBODIMENTS

The description sets out examples of a content based delivery system, with example scenarios being consistent, where applicable, with that set out in the context-based recommendation applications referenced above, the contents of which are incorporated herein by reference.

Figure 1:
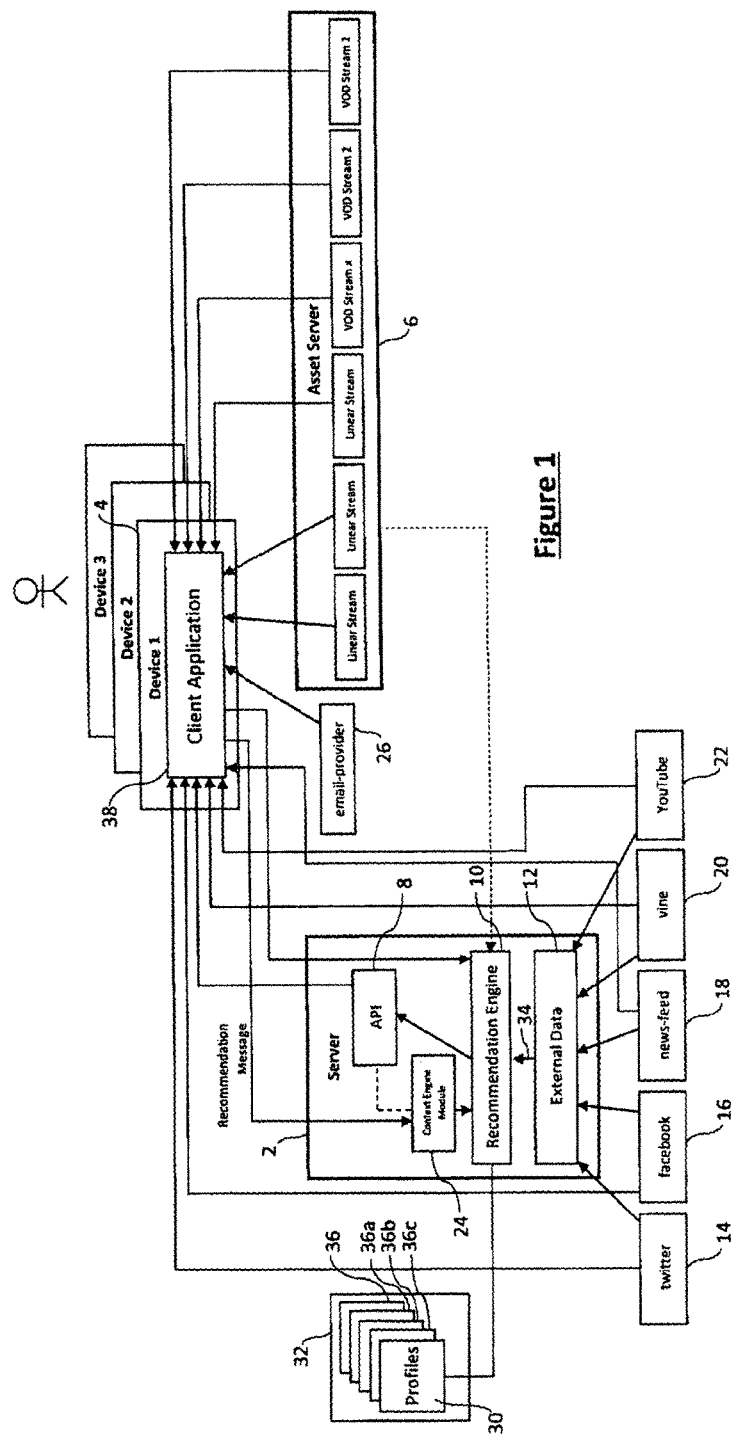
FIG. 1 illustrates the architecture of a content delivery system.

FIG. 1 is a schematic architecture of a high level design of a content delivery system. A control server 2 is connected to a user terminal 4 by any suitable communication network, whether wired or wireless. The network is not shown in FIG. 1 for reasons of clarity. The user terminal 4 is also in communication with an asset server 6 via a same or different network. The asset server supplies video assets which can be linear stream assets or VOD assets. The user terminal 4 requests assets from the asset server 6 based on information which it receives from the control server 2. The control server 2 comprises an API (for example a REST API) 8, a recommendation engine 10, data aggregator 12 and a context engine module 24. The recommendation engine data aggregator and context engine module are all implemented by a suitably programed processor or processors (not shown). The data aggregator is connected to a number of sources external to the control server 2, again by any suitable communication network. In this example, these sources comprise a Twitter feed 14 and a Facebook feed 16 (referred to herein as social media sources which generate social media updates), a newsfeed 18, a Vine feed 20 and a YouTube feed 22. These are exemplary only and it will readily be appreciated that other sources may be appropriate. The control server has access to user profiles 30, either in a local memory (not shown) or in a storage facility 32 accessible to the server. The data aggregator 12 receives information from these multiple sources and monitors their content so as to be able to supply content based information 34 to the recommendation engine 10. The recommendation engine 10 operates based on the content-based information supplied by the data aggregator 12 and user profile data to recommend content items to a consumer at a user terminal. The content items can be video assets which can be accessed at the asset server 6 or content from the sources themselves. Thus the recommendation engine 10 has information about all assets available in the asset server 6 and operates to recommend assets based on the content-based information 34 it receives from the external data aggregator 12.

The user terminal 4 is labelled "Device 1". A user may own multiple devices, which are indicated in FIG. 1 by the labelling Device 2, Device 3. Each of these devices is a user terminal. For example, a user 35 might own a tablet, a smartphone, and a laptop and a TV set. He may be using one or more devices at any particular time. In one particular use case mentioned later, he may for example, be using a smartphone (Device 1) and a TV set (Device 2), with the smartphone acting as a companion to the TV set. In any event, all the devices are capable of communicating with the server when they are active and logged on by the user. In FIG. 1, connections are shown between the user terminal 4 and the server 2. In particular, the user terminal 4 feeds data back to the context engine 24 and the recommendation engine 10. In addition, the devices can communicate with the asset server to obtain assets from the asset server.

In some embodiments, the system is capable of delivering content recommendations based on the type of device that a user is currently logged in to.

The user 35 has a profile 36 in the user profile 30. In this user profile are stored preferences and other information about the user 35 to allow recommendations to be made based on information personal to that user. In the present system, the user can set up individual sub-profiles, 36a, 36b, 36c, etc. which allow him to have different preferences in different situations that he may find himself in. This means that recommendations based on the user sub-profiles cold vary even for the same user when that user is in different settings. It will readily be appreciated that a single user is being discussed, but in practice the system operates with a large number of different users, where all users have profiles and sub-profiles set up for them respectively. Only a single profile and its sub-profiles is shown in FIG. 1 for the sake of convenience.

In addition to providing recommendations based on device type, the system provides recommendations based on other context parameters, as described in the context-based recommendation cases incorporated by reference herein.

The multiple content sources 14 to 22 are also accessible to the user terminal 4 itself as denoted by the various arrows. The purpose of these connections is to allow the user terminal 4 to access content from multiple sources 14 to 22 when invited to do so on the instructions received from the control server 2. Thus, these sources operate in two ways. Firstly they provide content to the external data aggregator 12 for driving the recommendation engine, and secondly they provide content items for display to a user at the user terminal, when they are recommended to the user terminal.

The context engine module 24 influences the recommendation engine so that the recommendations are based on the context of a user. The context of a user is perceived here to govern the behaviour of a user and therefore to affect their likely preferences for engaging with content. The likely context based preferences for a user can be determined by monitoring historical behaviour of a user, or can default to certain conditions based on information about the user, for example, in his user profile. A user can set or override context parameters associated with the context engine module 24 should they wish to do so. The context engine module 24 also influences the recommendation engine to define the number n and type of assets to be recommended to a user, based on context.

The user device 4 executes a client application 38 which cooperates with the context engine 24 to deliver context based recommendation.

The content delivery system is capable of compiling video snippets based on various context parameters including: location, time (possibly short-form in the day and long-form in the evening), device (flat screen TV, laptop, mobile device), available time (that is, the time available to a user to engage with particular content. The terms short-form and long-form define different types of assets—other types of content include news articles, linear news, social content. As mentioned above, different types of assets can be stored in the asset server 6, or available from the multiple sources 14 to 22. In addition, other assets can be available from different sources (not shown), for example, static news articles. Herein, the term "content" refers to any type of displayed images or text to a user; a content item is a piece of content. The term "asset" is used herein to denote video assets and also other types of content items without limitation.

The content, type and number of the recommended assets/content items varies with context, and is based on updates from at least one social media feed sharing characteristics with the consumer.

Figure 2:
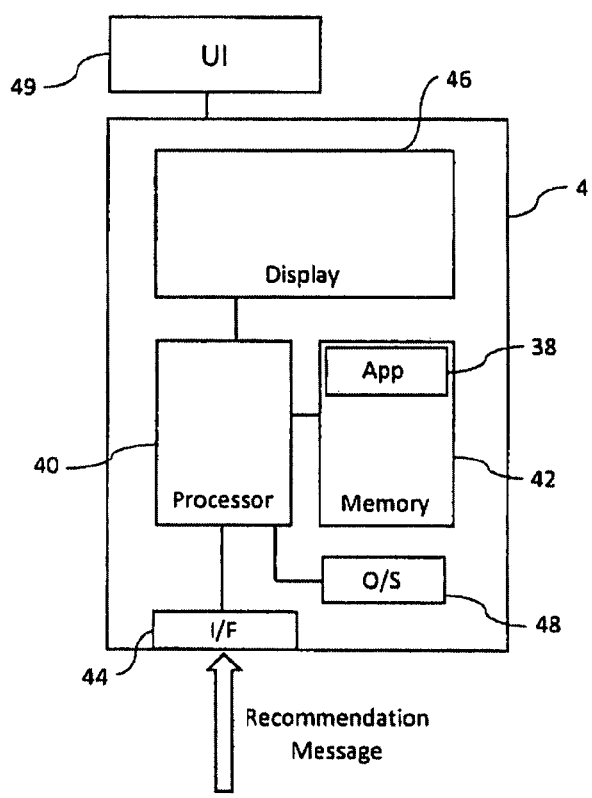
FIG. 2 is a schematic diagram of a user terminal.

FIG. 2 is a schematic block diagram of a user terminal 4. The user terminal 4 comprises a processor 40 and a memory 42. The client application 38 is stored in the memory 42 and is executed by the processor 40. The user terminal 4 also has an interface 44 and a display 46. The display is controlled by the processor 40. As will be evident from the following, instructions received from the server in a recommendation message by the interface 44 are used by the processor to control the display 46. Although one processor is shown, it will be evident that the display could in fact be controlled by a dedicated graphics card or dedicated driver responsive to the instructions received from the server. The user terminal 4 has its own operating system 48. When delivering content of different types to a display 46 of a known computer device, such as a smartphone or tablet, it is the operating system which is generally responsible for aggregating different types of content and driving the display to display those different types of content. In the present system however it is the app 38 which is executed by the processor 40 and which is responsive to instructions in the recommendation message from the server which controls the display and allows the display to show different types of assets. Thus, the application can be delivered to different kinds of devices running different kinds of operating systems (for example, android, IOS, etc.). Thus, a similar experience can be delivered to users even if they are using different device types. Moreover, it is the server itself which manages the layout of the display for a particular device and the content recommendations for a particular user, so that the particular OS which is being executed by the device to support the basic operations of the device does not affect the system. Moreover, the server can deliver a recommendation message to any user terminal executing the app 38 regardless of its operating system.

This allows an 'eco system' to be developed wherein an operator of the server can manage the content sources and recommendations to best fit the users that it is used to engaging with, to make maximum use of the knowledge of those users, their behaviours and profiles etc. For example, an owner of the server 2 can determine which content sources (14-22) are available and add their own specific content sources if they wish. This allows them to 'shape' content delivered to the user.

Figure 3:
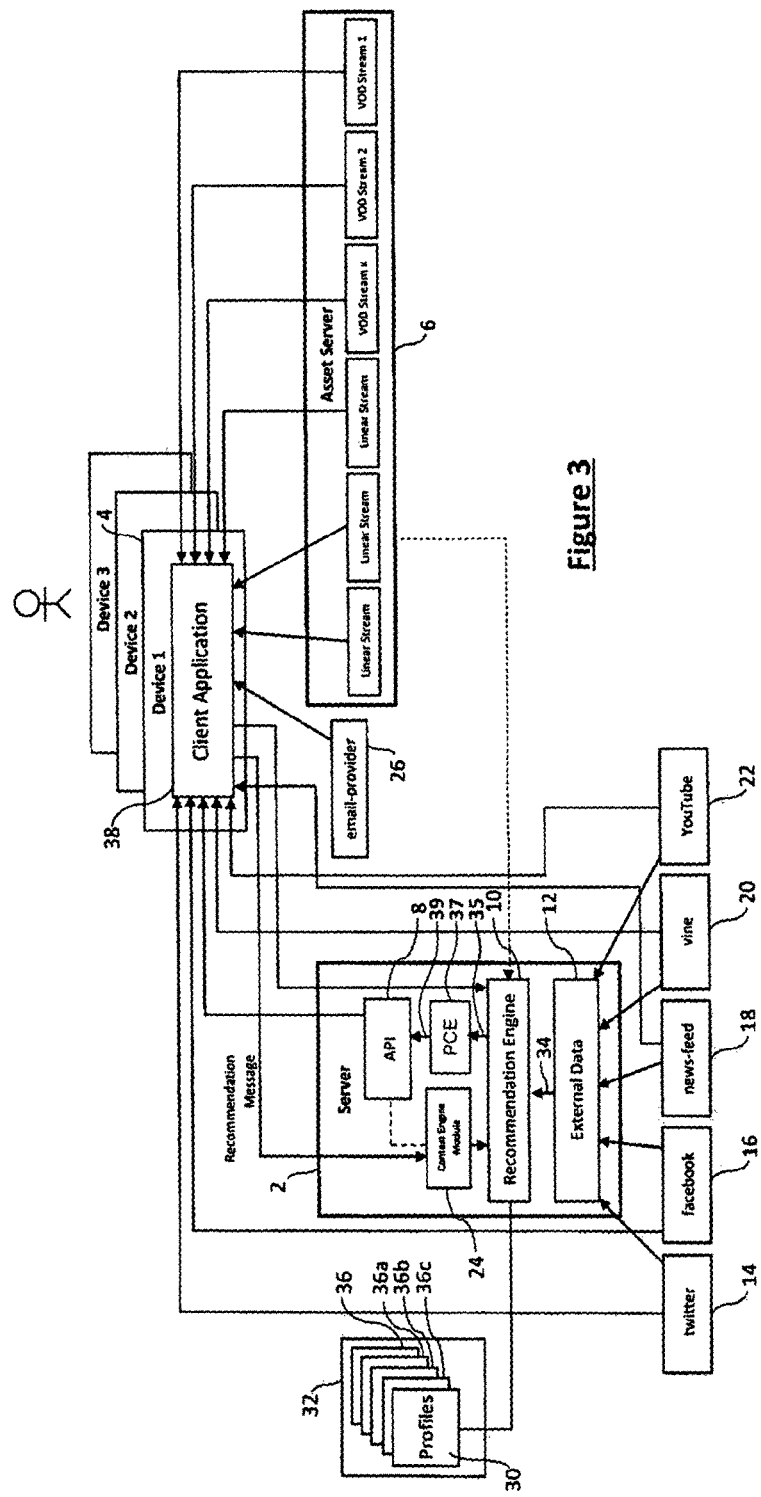
FIG. 3 illustrates the architecture of an improved content delivery system.

The content delivery system is further configured to create a personalised schedule defining a personalised channel comprising individualised video content for a particular user to watch by inclusion of a personalised channel engine (PCE) 37 as shown in FIG. 3. The content delivery system of FIG. 3 corresponds to that of FIG. 1, but includes the personalised channel engine 37 for receiving the output of the recommendation engine 10 on line 35 and generating an output to the API 8 on line 39.

The content delivery system of FIG. 3 does not show a direct connection from the recommendation engine 20 to the API 8, as in FIG. 1, as the output of the recommendation engine 10 is provided to the API 8 via the personalised channel engine 37. However in alternative implementations the direct path from the recommendation engine 10 to the API 8 may be provided as well, with different paths (either with or without the personalised channel engine) being utilised for different users and/or at different times.

The recommendation engine 10 provides content information on line 35 which comprises recommendations for the user based on the user context and the user preferences. Example criteria for the user preferences are viewing history; explicitly stated preferences; emerging social trends amongst similar people; and semantic linking of disparate content items.

Based on the content identified by the recommendation engine 10 and indicated on line 35, a personalised schedule may be created from the linear content only identified by the recommendation engine. The personalised schedule defines a personalised channel on which linear content is made available for the user sequentially in accordance with a defined personalised schedule.

Linear content is content associated with a sequence of programming that is played out on a single channel, one item after the other, in a predefined order. A linear schedule may include programmes that are live, and programmes that are pre-recorded (or repeated).

A personalised channel engine of a content delivery system utilising only linear content may create a personalised schedule defining a personalised channel for a user by selecting, from the complete set of linear channels available to the user based on the recommendations from the recommendation engine, a sequence of programmes for its recommended content that could run almost back-to-back.

For example, a first programme on one channel starts at 7:30 PM and runs through to 8:05 PM, followed by a second programme on a second channel starting at 8:15 PM to 9:15 PM, then a third programme on a third channel from 9:20 PM to 10 PM etc. The personalised content engine of the content delivery system 'stitches' together the recommended content from the various channels on the regular linear schedule to create a personalised schedule.

Gaps in the personalised schedule can be filled with, for example, adverts or trailers. If available, other short-form content such as appropriate YouTube, Vimeo, FlicKr videos etc. may be added.

There is thus provided a content delivery system for providing content to a user, comprising a controller configured to generate a user schedule in dependence on recommended linear content for the user, the recommendation being based on the user preferences and user context.

A personalised schedule may be created from catch-up content. Catch-up content is an item of content from a linear channel that is available to watch again for a limited period after its airing.

The personalised channel engine of the content delivery system can be configured for operators that offer a catch-up television service as well as a linear television service to create a personalised schedule for a user that is more seamless than a personalised channel based on linear content alone. Where there would be gaps in the schedule of a personalised schedule based on recommendations of linear content, the personalised channel engine of the content delivery system can be configured to select from content available on catch-up to insert into the gaps.

A further refinement permits the personalised channel engine of the content delivery system to include programmes that have already started, but to time shift them to fit the personalised content schedule.

A requirement may be, for a linear asset, for the scheduled start time of the linear asset to fall within the time window of the personalised schedule, and for the time shift to adjust the start time of the linear asset such that it still falls within the time window of the personalised schedule. A linear asset may be restricted in time-shifting it to ensure that it's end time is before the end time of the window.

For example, the personalised content engine schedules a first programme from a first television channel from 7:30 PM to 8:05 PM as before. A second television programme is identified by the recommendation engine, and is on a second television channel starting at 7:55 PM. With catch-up and time shifting, the personalised content engine can schedule the second television programme on the second television channel to start at 8:05 PM on the personalised schedule for the user. The user watches the second television programme out of synchronisation with the linear schedule in accordance with its personalised schedule on its personalised channel.

On-demand content is an item of content that may or may not have been shown on a linear channel, but which is available to watch whenever the user wishes.

Where a user has access to an on-demand catalogue, a personalised schedule can be created using linear content, but also by choosing appropriate items from the on-demand catalogue, such as a video-on-demand (VOD) library. This eliminates the need for any gaps, other than gaps of an appropriate duration to cater for adverts—for example 2 to 3 minute gaps. This also removes the possibility of populating the personalised schedule with lower quality matches from the available linear channels.

The content delivery system may thus utilise the personalised channel engine to create a personalised schedule for a user that matches the changing nature of each user context during a day, or during an evening, or during a weekend for example, by generating the personalised schedule based on the output of the recommendation engine. The changing nature of the user context is taken into account because the personalised channel is generated utilising the output of the recommendation engine. In addition to, or in place of a set of recommendations being provided based on knowledge of user profiles and user context by the recommendation engine a personalised channel is created based primarily around linear content which is naturally restricted for consumption, so that this feature provides a channel that is focusing mainly on linear content rather than on any asset that is available.

Other assets are used to "fill in" possible gaps in the scheduling of the personalised channel. A personalised schedule, or sections thereof, may be shared by a user so that friends can join in and watch with them.

Broadcasters wishing to create custom channels for whole sections of their over-the-top (OTT) audience can create personalised schedules and corresponding personalised channels in the same way for individual users. Thus a broadcaster could create a personalised schedule, the associated personalised channel for which is then provided to a specific users of that broadcaster, the personalised channel including content specific to the broadcaster.

For operators with online video platform (OVP) or other short form content, such as churches, sports clubs, or enterprise customers, personalised schedules may be created that blend any available long-form content with their shorter content. In particular for church or sports club customers, where short-form might be the dominant format, it may be possible to create whole personalised channels of appropriate content tailored to a user based on what the content delivery system knows about their tastes and preferences for a given context. A personalised schedule may then be created for a user which is specific to their recommendations from the recommendation engine, but is customised to include the specific content relating to church or sports. Content could be "shaped" using the ecosystem architecture described earlier.

Figure 4:
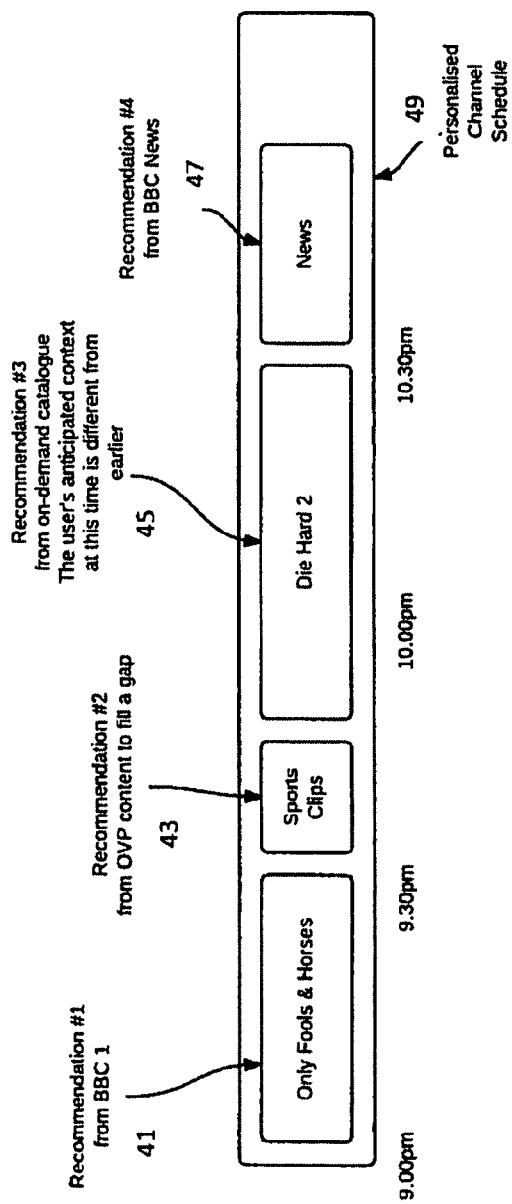
FIG. 4 illustrates an example personalised channel.

With reference to FIG. 4 there is illustrated an example personalised channel and it's scheduling. Reference numeral 49 illustrates the personalised channel. A time-line from 9 pm is shown for the personalised channel, and the personalised channel includes a sequence of non-overlapping content. A first programme 41 is selected and scheduled to start at approximately 9 PM based on the output of the recommendation engine. The programme 41 is linear content from a first broadcast channel. After this programme finishes a short clip of OVP content 43 is scheduled. Then a content 45 from the user's on-demand catalogue is scheduled. This selection may be based on the recommendation engine's suggestions the recommendation engine having changed the recommendation based on the user's context having changed. Next a programme 47 is selected and scheduled to start, which programme is linear content from a second broadcast channel. Thus it can be seen that a personalised schedule is generated for a personalised channel, with none of the content of the channel overlapping, and the content being selected based on the user's context and profile which are inherent to the recommendations provided by the recommendation engine and proceed by the personalise content engine. These recommendations may change as the user context changes, for example the future expected or the current user context changes.

Reference is made herein to the personalised channel schedule being constructed using a linear asset, and a further example is set out below with reference to a linear asset. However in general embodiments relate to preparing a personalised schedule based on a constrained asset, and a linear asset is one example of a constrained asset.

Another example of a constrained asset is an asset with a linear lifetime, i.e. an asset that is only available for a particular time window.

Another example of a constrained asset is a live asset. A live asset may be similar to a linear asset, but have a different rights environment or additional restrictions like not being able to be time-shifted. Live assets may in fact get the highest priority when a schedule is built.

A further example of a constrained asset is an asset having a play-out constraint. An asset having a play-out constraint may be associated with a contractual obligation for play-out. The contractual obligation may be for a certain number of play-outs within a given time window. This certain number may dictate that the asset can only be played-out a limited number of times within the time window. The contractual obligation may be an obligation to play-out a specified additional asset after the play-out constrained asset is played. A play-out constrained asset may or may not be time constrained.

An example follows in which there is described the use of a personalised channel engine to create a personalised schedule for a personalised channel for a user, based on the users preferences and/or context at particular times and the available linear content (as an example of a constrained asset) for those times.

In this example reference is made to assets: limited lifetime assets and persistent assets. An asset is a portion of content. A limited lifetime asset is content which has a limited lifetime. The content may have a limited lifetime because it is catch-up content that is available only for a limited time, for example. The limited lifetime asset may be any type of content, for example a television programme, YouTube content etc. A persistent asset is content which does not have a limited lifetime, and is available to be accessed at any time. On-demand content is an example of a permanent asset. A linear asset is an asset which is communicated on a channel at a fixed time.

Figure 5:
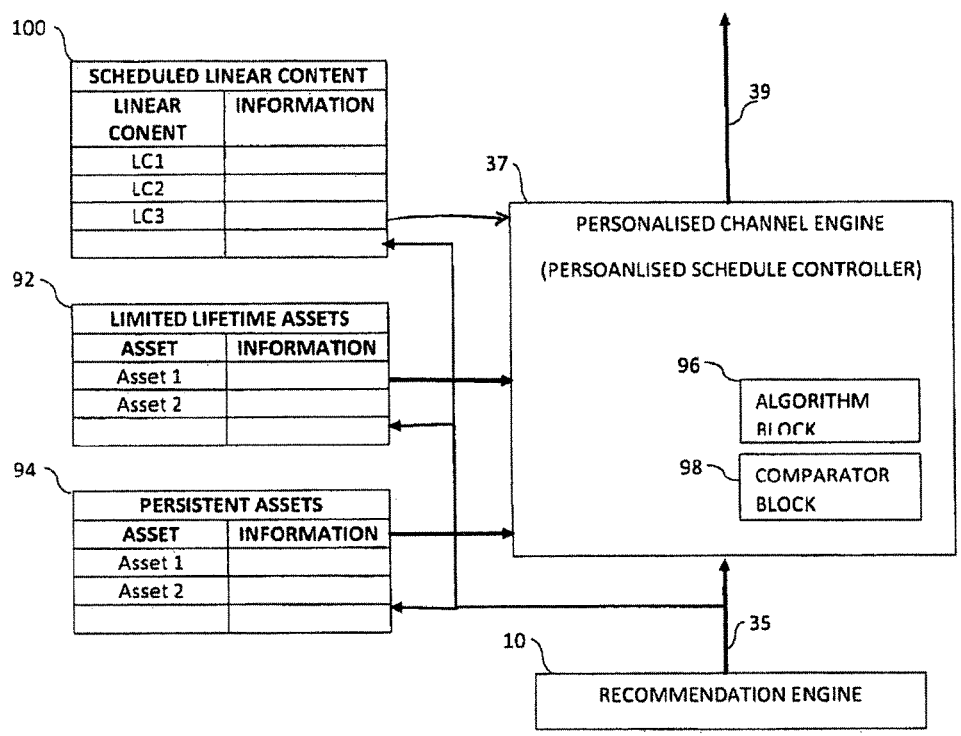
FIG. 5 illustrates a schematic of detail of a content delivery system.

FIG. 5 illustrates components of an exemplary content delivery system including a personalised channel engine for creating a personalised schedule for a personalised channel made up, at least in part, of linear broadcast content, and preferably comprising a mix of linear broadcast content and limited lifetime assets and/or persistent assets.

Like reference numerals are used in FIG. 5 to refer to elements which correspond to elements of FIG. 3. With reference to FIG. 5, the system is shown to include the recommendation engine 10, and the personalised channel engine 37. The personalised channel engine may more generally be referred to as a personalised schedule controller.

In addition there is shown a list of scheduled linear content in a table 100, a list of limited lifetime assets in a table 92, and a list of persistent assets in a table 94.

The personalised channel engine 37 is additionally illustrated as including one or more algorithm functions in an algorithm block 96 and one or more comparators in a comparator block 98.

The tables 92, 94 and 100 are populated with identifiers which include the recommendations for the user based on the information from the recommendation engine 10. An identifier for each recommendation may be stored in the appropriate tables and the identifier may include a link to the location at which the actual content is stored. The tables 92, 94 and 100 are thus populated by the recommendation engine 35, and accessed by the personalised channel engine in order to generate a personalised schedule.

For example purposes the content delivery system is described as providing a personalised channel for a single user. However it will be understood by one skilled in the art that the described techniques applies more generally to multiple users.

Examples of scheduled linear content which may be listed in the table 100 are linear programmes scheduled for broadcast on various channels. The information that is stored with such linear content may include the scheduled time of transmission and the duration.

Examples of limited lifetime assets which may be listed in the table 92 for a particular user, may be a catch-up asset available for a particular time, which is only added when available. Examples of other limited lifetime assets may relate to live information such as news or sports assets.

Examples of persistent assets which may be listed in the table 94 are videos.

In generating a personalised schedule, the schedule is being prepared for a time window having a start time and an end time.

The personalised content engine 37 is illustrated as receiving information from the recommendation engine 35, from the scheduled linear content table 100, from the limited lifetime assets table 92, and from the persistent assets table 94.

The personalised channel engine is configured to provide a personalised schedule on line 39 to the API for a particular user. The personalised schedule may inherently be based on the user context, as the user context is considered by the recommendation engine in generating recommendations, and provides a personalised schedule of linear content.

If more than one item of linear content is indicated by the recommendation engine as being of interest to the user at a particular time, then an algorithm is applied in order to determine which content will be listed in their personalised schedule.

Further, a threshold may be applied to only select those linear content assets which have a recommendation relevance above a particular threshold. Thus not all listed linear content may be selected, on the basis that the relevance of any content is determined to be below the recommendation threshold.

If based on the linear content the personalised schedule for the user contains gaps, being timeslots for which there is no linear content, and then the information in the limited lifetime assets table 92 and the persistent assets table 94 can be accessed in order to fill these gaps.

In a preferred arrangement the gaps may be first filled in accordance with any content which is available in the limited lifetime assets table, on the basis that as this content has a limited lifetime then it is preferable for it to be viewed ahead of any assets which are listed in the persistent assets table 94. The personalised content engine 37 may then look to add content to the personalised schedule for a user based on persistent assets listed in the persistent asset table 94 only if there is no asset in the limited lifetime assets table 92.

In filling gaps and selecting content from the linear lifetime assets and/or the persistent assets, the relevance of the asset may be compared to a relevance threshold before it is selected.

Figure 6:
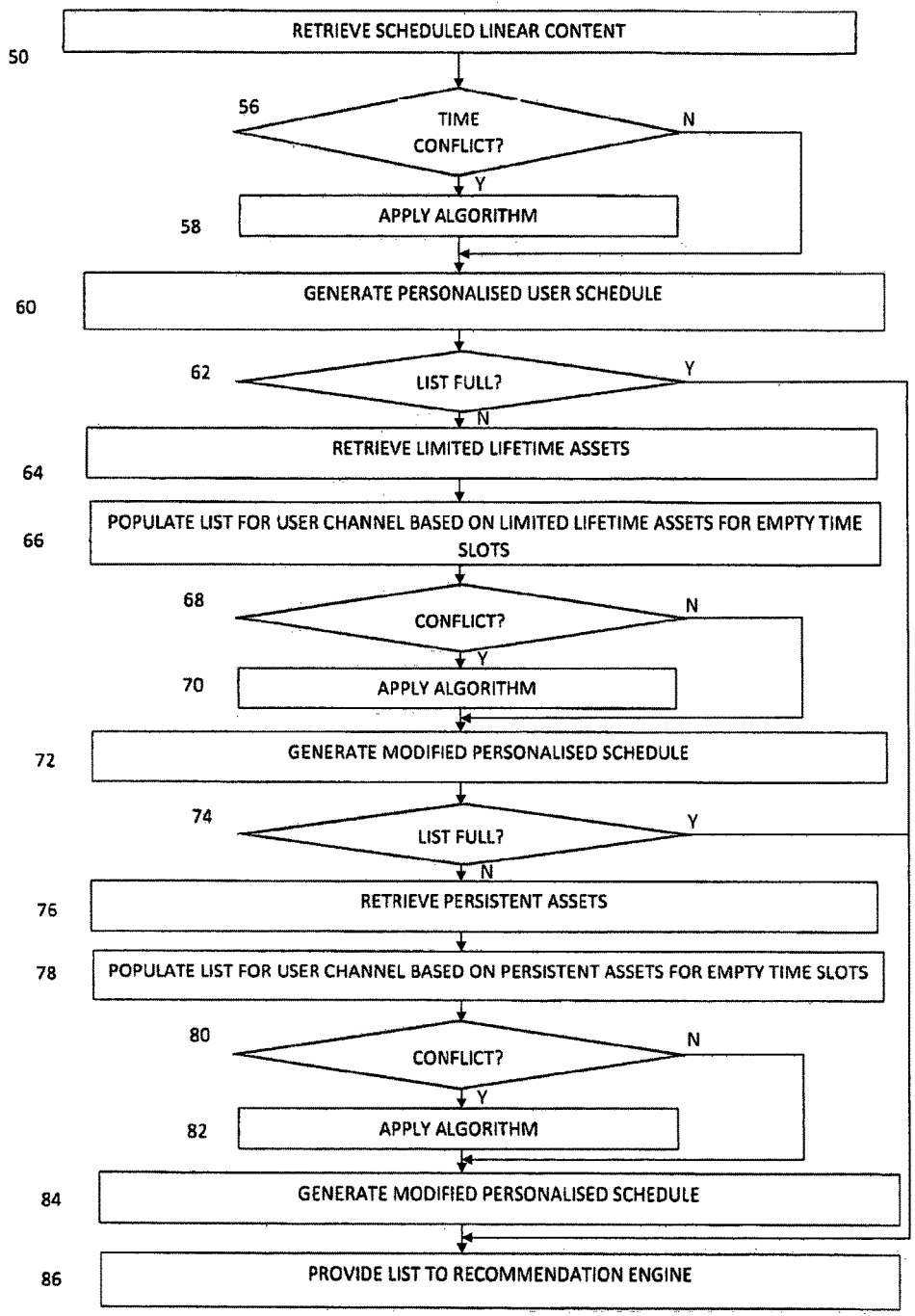
FIG. 6 illustrates a flow process for operation of the content delivery system of FIG. 3 and, FIG. 7 describes the process the scheduler iterates through to fill each slot.

The operation of the generation of a personalised schedule channel in accordance with the content delivery system of FIG. 5 is now further described with additional reference to the flow process of FIG. 6.

In a step 50, the personalised channel engine 37 retrieves the scheduled linear content from table 100. The scheduled linear content retrieved has already been recommended by the recommendation engine based on knowledge of user context and/or user profiles. Although not shown, the retrieved linear content may be additionally compared to a recommendation threshold to determine if it should be used in the personalised channel.

In step 56 it is then determined whether there is a conflict at a given time, for example there being more than one selected linear content scheduled at a given time. In the event that such a time conflict exists, then in a step 58 an algorithm is applied in the algorithm block 96. After the algorithm is applied, or if no conflict exists, then in step 60 a personalised user schedule is generated for a personalised user channel based on scheduled linear content which have been recommended or selected based on knowledge of user context and/or profiles.

The algorithm may time-shift linear content to allow it to be included, and where a clash exists which cannot be resolved by time shifting it may determine which linear content is retained.

In step 62 it is then determined if the list is full. If the list is not full, then in step 64 the personalised content engine retrieves the list of limited lifetime assets from the limited lifetime assets table 92. In step 66 the personalised schedule is then populated for the personalised channel based on the list of limited lifetime assets retrieved, for the empty timeslots. The limited lifetime assets have been recommended or selected based on knowledge of user context and/or profiles In a step 68 it is determined whether a conflict exists, for example there being more limited lifetime assets available than there are available empty timeslots. If a conflict exists, then an algorithm is applied in step 70 using the algorithm block 96.

After the algorithm is applied, or if no conflict exists, then in step 72 a modified generated personalised schedule for the personalised channel based on limited lifetime assets is produced.

In step 74 it is then determined if the list is full. If the list is not full, then the personalised content engine 37 retrieves the list of persistent assets for the user from table 94 in step 76. In step 78 the personalised schedule is then populated for the personalised channel based on the persistent assets for empty timeslots. In step 80 it is determined whether a conflict exists, for example there being more persistent assets available then there are available timeslots. If a conflict exists, then an algorithm is applied in step 82 using the algorithm block 96.

After the algorithm is applied, or if there is no conflict, then in a step 84 a modified personalised schedule for the personalised channel based on the persistent assets is produced.

Thereafter in a step 86 the personalised schedule is finalised and provided by the personalised channel engine 37 on line 39.

If in either steps 62 or 74 it is determined that the personalised schedule is full, then the process jumps to step 86 and the personalised schedule is provided on line 39.

As the personalised channel schedule is based on information provided by the recommendation algorithm, and the recommendation algorithm in turn takes into account user context, should the user context change at any point the recommendation from the recommendation engine changes, and as a consequence the personalised channel schedule will change as necessary.

Any algorithm may utilise a standard recommendation function.

In example implementations, the recommendations may be recommendations of different types of asset. Different types of asset may be constrained assets or non-constrained assets. In addition, there may be different types of constrained assets and different types of non-constrained assets. Examples of different types of constrained assets are linear assets, limited lifetime assets, live assets, and play-out constrained assets. The constrained assets may, as with these examples, be time-constrained assets. A persistent asset is an example of a non-constrained asset.

Where the recommendations comprise different types, then a priority may be allocated to each type, so that a particular type of asset is considered for inclusion in the personalised schedule as the highest priority, and then a lower priority type of asset is considered only if the personalised schedule is not filled with the assets of the current priority type being considered.

Thus, assets types are considered in accordance with their priority, assets types of the next priority being considered in turn only if the personalised schedule is not filled with asset types of the current priority under consideration.

In addition, in considering assets within each asset type, or in considering assets in general, a threshold may be taken into account, so that assets are only considered for inclusion in the personalised schedule if they have a recommendation relevance which is above a certain threshold. Where an asset is considered for a given priority type which has a recommendation relevance below the threshold, then assets of the next priority type are considered. This allows the personalised schedule to be populated by recommendations which are most relevant, rather than necessarily just being populated by assets of the highest priority type.

For example if a recommendation identifies both linear and persistent assets, the assets of the type linear may be given a higher priority than assets of the type persistent. The linear assets are thus considered first. However a threshold is also provided, so that only the linear assets which have a recommendation relevance above the threshold are considered for entry in the personalised schedule. Once all linear assets above the threshold are considered, then if the personalised scheduled is not filled the persistent assets are considered, but again only those persistent assets above the threshold are considered for inclusion in the personalised schedule. The threshold for the different types of asset may be different.

Figure 7:
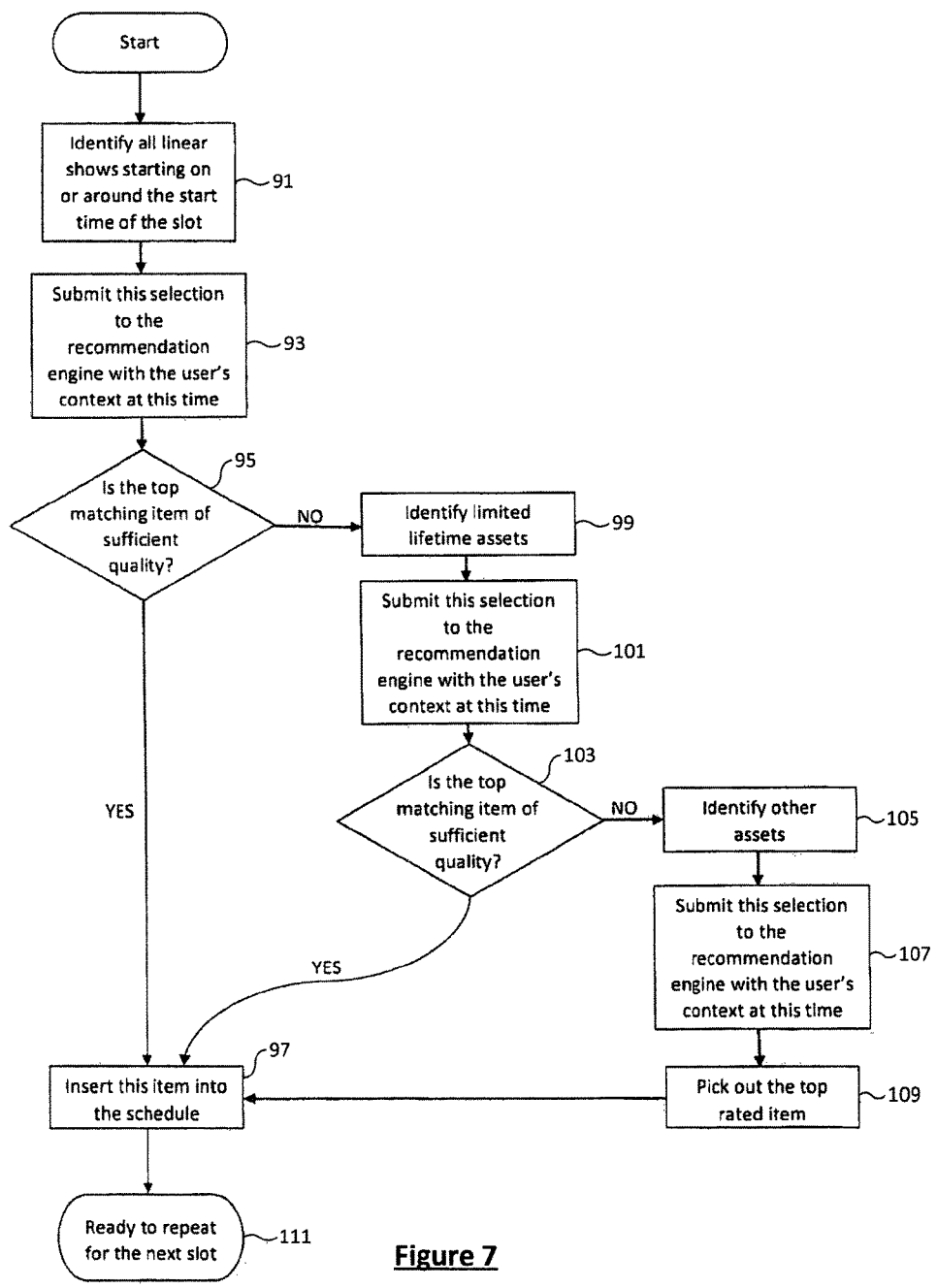

FIG. 7 is a flowchart that describes an example process a system may iterate through in order to fill each slot.

In this example linear asset types have the highest priority, limited lifetime asset types have a medium priority, and then all other asset types have the lowest priority.

In a step 91 all linear programmes available at or around a given start-time are identified. The implementation will determine the proximity to a given start time that programmes are to be identified for as being 'around' the given start time.

The identified programmes are submitted in a step 92 to the recommendation system, which then returns a ranked list with the best match appearing at the top. The ranking will utilise information available to the recommendation engine to rank the programmes in order of recommendation to the user.

Step 93 refers to submitting the selection with the user's context, but the use of context is optional.

If in step 95 it is determined if the top item is good enough or of sufficient recommendation quality that item goes into the schedule in step 97. A programme may be determined to be good enough or of sufficient quality if it's recommendation rating is above a predetermined threshold, as discussed above.

Step 94 refers to determining if the top matching item is of sufficient quality. This is only an example, in fact all items may be compared to determine if they are of sufficient quality, or a certain number of items compared. By quality, the comparison determines whether the match is sufficiently high that the item is likely to be of relevance. However FIG. 7 illustrate the process for one piece of content, and so on each iteration the top matching item is compared in step 94, and for later iterations some linear items will already have been processed and placed in the personalised schedule.

The threshold is used since if the match is not good enough quality, it is preferable to include limited lifetime or persistent assets in the personalised schedule rather than poor quality (i.e. poor matches) linear content.

If there are no good matches, then the recommendation logic operates again on the limited lifetime items 99, 101, 103 and so on.

If there are no good matches for limited lifetime assets, then the recommendation logic operates again on other assets in steps 105, 107, 109.

Thus, if it is determined in step 95 that the top ranked linear programme is not of sufficient quality (i.e. does not have high enough ranking), then steps 99 and 101 are performed which duplicate steps 91 and 93 but for limited lifetime assets. There is then performed step 103 which duplicates step 95 for limited lifetime assets.

If there are no good matches determined in step 103, then other assets are identified in step 105, step 107 is performed duplicating step 93, and then in step 109 the top rated item is picked.

In each of steps 95 and 103, if the top ranked item is of sufficient quality then that item is inserted into the schedule in step 97. Similarly step 97 follows step 109.

Following the insertion of the item into the schedule, in step 111 the process is repeated for the next slot.

In the above example, there is described an arrangement of populating a personal channel using linear content, limited lifetime assets and persistent assets. An implementation may use a mix of constrained and non-constrained assets, and may use more than one type of constrained asset. The implementation may define the order in which the various assets are considered for populating the personalised channel. Where more than one type of constrained asset is present, the different types may be processed in an order determined by the implementation.

Examples of constrained assets are linear assets, live assets, limited lifetime assets, or play-out constrained assets.

Examples of non-constrained assets are persistent assets.

Where a personalised schedule is to be populated using live assets and linear assets, the live assets may be prioritised. Thus linear assets may only be considered once the live assets have been considered.

In the foregoing examples only one asset is allocated to any given time slot.

Whilst in the above examples it is discussed how the personalised channel is built using different types of assets, other rules may also be applied in building the schedule. Thus whilst the above refers to considering assets in order according to the priority of assets of that type, and then within each priority only considering assets which exceed a threshold, other factors are taken into account in determining whether an asset of any type exceeding a threshold is included in the personalised schedule.

For example, it may be acceptable to time-shift a linear asset, but it may not be acceptable to time-shift a live asset. Scheduling of an asset which comprises a second episode of a TV series may not be allowed if it is determined that the user has not viewed the first episode of the TV series. Two linear assets determined to have a relevance exceeding a threshold may not be both included in a personalised schedule due to a clash between their transmission times (which cannot be resolved by time-adjustment). These and other additional rules may be applied in addition to the scheduling of the constrained assets, to determine the content to be placed in the personalised schedule. One skilled in the art will appreciate the additional rules which can be applied.

There has been described particular examples in relation to a content delivery system. Embodiments are not limited to the specifics of any particular example, nor are embodiments limited to the implementation of the specifics of any particular example in combination. Individual aspects of described examples may be utilised either in combination or alone.

Embodiments have been described by way of reference to various examples to help in understanding. Embodiments are not limited to the detail of any example unless such detail is presented as essential by inclusion in an independent claim. All details of all embodiments may be combined either selectively or as a whole, and any embodiment does not exclude any combination nor is any embodiment limited to any combination unless such combination is presented as essential by inclusion in an independent claim.

Embodiments may be implemented in an apparatus, a method, or computer program code.

The apparatus may be a user device, or a server to which a user device is connected, or a system comprising a user device and a server. Each apparatus may include, at least, a processor and a memory and generally be implemented in a user device, or a server to which a user device is connected, or both a user device and a server.

The method may be a computer program. A computer program may be a computer program or executable code which, when run or executed on an apparatus, performs the method. The computer program or executable code may be run on the user device, or the server, or both the user device and the server.

The computer program may be stored on a memory, and may be stored across multiple memories. The memory may be a memory of a functional device, or may be a specific memory storage apparatus such as a memory disk or memory stick. The memory may be a memory available on a network, such as a memory area available in a network such as an area of a so-called 'cloud'.

Aspects of the embodiments described herein include any or all of the described features used in any combination. In addition, methods, and computer programs for implementing the method, are contemplated.

The invention claimed is:

1. A content delivery system for delivering a personalised channel comprising content recommendations to a user, for a time window having a window predetermined start time and a window predetermined end time, the content delivery system comprising:
   a recommendation engine configured to generate a personalised schedule with recommendations for the personalized channel for the user, wherein the recommendations include constrained assets and non-constrained assets; and
   a personalised schedule controller configured to:
      allocate the recommended constrained assets to a high priority, and allocate the recommended non-constrained assets to a low priority;
      retrieve the high priority recommended constrained assets, compare each high priority recommended constrained asset to a constrained relevance threshold, and select one or more of the recommended constrained assets meeting the constrained relevance threshold for the personalised channel, wherein each of the recommended constrained assets has a start time and an end time, and wherein the personalised schedule controller is configured to time shift one or more of the recommended constrained assets to a different asset start time after the window predetermined start time and a different asset end time before the window predetermined end time, wherein recommended constrained assets are selected and if necessary time-shifted until no more can be added to the personalised channel, wherein each constrained asset does not overlap in time with any other constrained asset in the personalised channel as a result of the time-shifting; and
      responsive to determining that the personalised channel contains time gaps, retrieve the low priority recommended non-constrained asset, compare each low priority non-constrained asset to a non-constrained relevance threshold, and select one or more of the recommended non-constrained assets meeting the non-constrained relevance threshold for the personalised channel, wherein each of the recommended non-constrained assets has a duration, and wherein the duration of each recommended non-constrained assets is within the personalised channel time window and does not overlap in time with any other selected recommended constrained asset or recommended non-constrained asset.

2. The content delivery system of claim 1 wherein the constrained asset is one of a live asset and a play-out constrained asset.

3. The content delivery system of claim 1 wherein for more than one type of constrained asset, different types of constrained assets are allocated to different priorities.

4. The content delivery system of claim 1 in which the content recommendations for the user are generated dynamically based on a user context, such that as the user context changes at any point the recommendations from the recommendation engine change, and as a consequence the personalised channel schedule changes.

5. The content delivery system of claim 1 wherein the constrained assets include linear assets and time limited assets and the non-constrained assets include persistent assets, wherein the recommendations include linear assets, limited lifetime assets, and persistent assets, and wherein the personalised schedule controller is further configured to:
   allocate the recommended linear assets to the high priority, allocate the recommended limited lifetime assets to a medium priority, and allocate the recommended persistent assets to the low priority;
   retrieve the high priority recommended linear assets, compare each high priority recommended linear asset to a linear relevance threshold, and select one or more of the recommended linear assets meeting the linear relevance threshold for the personalised channel which does not overlap with any other selected recommended linear asset;
   if it is determined that the personalised channel contains gaps in time, retrieve the medium priority recommended limited lifetime assets, compare each medium priority limited lifetime asset to a limited lifetime relevance threshold, and select one or more of the recommended limited lifetime assets meeting the limited lifetime relevance threshold for the personalised channel which does not overlap in time with any other selected recommended linear asset or recommended limited lifetime asset; and
   if it is determined that the personalised channel contains gaps in time, retrieve the low priority recommended persistent assets, compare each low priority persistent asset to a persistent relevance threshold, and select one or more of the recommended persistent assets meeting the persistent relevance threshold for the personalised channel, wherein each of the recommended persistent assets has a duration, and wherein the duration of each selected persistent asset is within the personalised channel window, and does not overlap in time with any other selected recommended media asset, recommended limited lifetime asset or recommended persistent asset;

wherein the personalised schedule controller is configured to select the at least one of the recommended linear assets or the recommended limited lifetime assets for the personalised schedule, and if necessary time shift the at least one of the recommended linear assets or the recommended limited lifetime assets to a different asset start time after the window predetermined start time and a different asset end time before the window predetermined end time.

6. The content delivery system of claim 1 wherein if there is a conflict at a given time within the personalised channel, an algorithm is used to select the conflicted assets.

7. The content delivery system of claim 1 wherein the recommendation engine is further configured to generate recommendations for the personalised channel for the user based on the user profile.

8. The content delivery system of claim 1 wherein there is provided a constrained asset which is not a time constrained asset.

9. The content delivery system of claim 1 wherein if a constrained asset is a live asset it is not time shifted.

10. The content delivery system of claim 6 wherein a constrained asset is time-shifted to resolve a conflict in time.

11. A method for delivering a personalised channel comprising content to a user, for a time window having a window predetermined start time and a window predetermined end time, comprising:

receiving content recommendations for the user for the time window from a recommendation engine, wherein the recommendations include at least one constrained asset and at least one non-constrained asset; and generating a personalised schedule by:
    allocating the recommended constrained assets to a high priority, and allocating the recommended non-constrained assets to a low priority;
    retrieving the high priority recommended constrained assets, comparing each high priority recommended constrained asset to a constrained relevance threshold, and selecting one or more of the recommended constrained assets meeting the constrained relevance threshold for the personalised channel, wherein each of the recommended constrained assets has a start time and an end time, and time shifting one or more of the recommended constrained assets to a different asset start time after the window predetermined start time and a different asset end time before the window predetermined end time, and selecting recommended constrained assets until no more can be added to the personal channel, wherein each constrained asset does not overlap in time with any other constrained asset in the personal channel as a result of time-shifting; and
    responsive to determining that the personalised channel contains gaps in time, retrieve the low priority recommended non-constrained assets, comparing each low priority non-constrained asset to a non-constrained relevance threshold, and selecting one or more of the recommended non-constrained assets meeting the non-constrained relevance threshold for the personalised channel, wherein each of the recommended non-constrained assets has a duration, an wherein the duration of each selected non-constrained asset is within the personal channel window, and does not overlap in time with any other selected recommended constrained asset or recommended non-constrained asset.

12. The method of claim 11 wherein the constrained asset is one of a live and a play-out constrained asset.

13. The method of claim 11 further comprising, where there is more than one type of constrained asset, allocating different priorities to the different types of constrained asset.

14. The method of claim 11 further comprising generating the personalised schedule dynamically based on user context, such that as the user context changes at any point the recommendations from the recommendation engine change, and as a consequence the personalised schedule changes.

15. A non-transitory computer-readable medium embodying thereon a computer program for performing the method of claim 11.

16. A computer program product for storing a computer program embodied on a non-transitory computer-readable medium, the computer program for performing, when executed on a computer, the method of claim 11.

17. The method of claim 11 wherein the constrained assets include linear assets and time limited assets and the non-constrained assets include persistent assets, wherein the recommendations include linear assets, limited lifetime assets, and persistent assets, and wherein the method further comprises:

allocating the recommended linear assets to the high priority, allocating the recommended limited lifetime assets to a medium priority, and allocating the recommended persistent assets to the low priority;

retrieving the high priority recommended linear assets, comparing each high priority recommended linear asset to a linear relevance threshold, and selecting one or more of the recommended linear assets meeting the linear relevance threshold for the personalised channel which does not overlap with any other selected recommended linear asset;

if it is determined that the personalised channel contains gaps in time, retrieving the medium priority recommended limited lifetime assets, comparing each medium priority limited lifetime asset to a limited lifetime relevance threshold, and selecting one or more of the recommended limited lifetime assets meeting the limited lifetime relevance threshold for the personalised channel which does not overlap with any other selected recommended linear asset or recommended limited lifetime asset; and if it is determined that the personalised channel contains gaps in time, retrieving the low priority recommended persistent assets, comparing each low priority persistent asset to a persistent relevance threshold, and selecting one or more of the recommended persistent assets meeting the persistent relevance threshold for the personalised channel, wherein each of the recommended persistent assets has a duration, and wherein the duration of each selected persistent asset is within the personal channel window, and does not overlap in time with any other selected recommended media asset, recommended limited lifetime asset or recommended persistent asset;

wherein the personalised schedule controller is configured to select the at least one of the recommended linear assets or the recommended limited lifetime assets for the personalised schedule, and time shift the at least one of the recommended linear assets or the recommended limited lifetime assets to a different asset start time after the window predetermined start time and a different asset end time before the window predetermined end time.

18. The method of claim 11 wherein if there is a conflict at a given time within the personalised channel, an algorithm is used to select the conflicted assets, wherein a constrained asset is time-shifted to resolve a conflict in time.

19. The method of claim 11 wherein there is provided a constrained asset which is not a time constrained asset.

20. The method of claim 11 wherein if a constrained asset is a live asset it is not time shifted.

* * * * *